US008375367B2

(12) United States Patent
Briggs (10) Patent No.: US 8,375,367 B2
(45) Date of Patent: Feb. 12, 2013

(54) TRACKING DATABASE DEADLOCK

(75) Inventor: Mario Ds Briggs, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 12/536,683

(22) Filed: Aug. 6, 2009

(65) Prior Publication Data

US 2011/0035730 A1    Feb. 10, 2011

(51) Int. Cl.
*G06F 9/44*    (2006.01)
*G06F 11/00*    (2006.01)

(52) U.S. Cl. ........ 717/128; 717/127; 717/129; 717/130; 717/131; 717/132; 717/133; 714/45

(58) Field of Classification Search .................. None
See application file for complete search history.

(56) References Cited

U.S. PATENT DOCUMENTS

| | | | |
|---|---|---|---|
| 6,219,666 B1 * | 4/2001 | Krishnaswamy et al. .... | 707/607 |
| 6,275,823 B1 | 8/2001 | Ronstrom | |
| 7,925,791 B2 * | 4/2011 | Ellis et al. ...................... | 709/248 |
| 8,108,350 B2 * | 1/2012 | Rohwedder et al. ........... | 707/648 |
| 2003/0023656 A1 | 1/2003 | Hutchison et al. ............. | 709/100 |
| 2005/0086031 A1 | 4/2005 | Yoshida et al. | |
| 2006/0101081 A1 | 5/2006 | Lin et al. | |
| 2006/0224588 A1 | 10/2006 | Laonipon et al. | |
| 2007/0038981 A1 * | 2/2007 | Hanson et al. ................. | 717/114 |
| 2007/0055727 A1 * | 3/2007 | Hanson et al. ................. | 709/203 |
| 2007/0101327 A1 * | 5/2007 | Burdick et al. ................. | 718/100 |
| 2009/0106746 A1 * | 4/2009 | Chaudhuri et al. ............ | 717/158 |
| 2009/0276754 A1 * | 11/2009 | Lind et al. ...................... | 717/106 |

FOREIGN PATENT DOCUMENTS

| | | |
|---|---|---|
| EP | 1569121 | 8/2005 |
| WO | WO0159568 A2 | 8/2001 |

OTHER PUBLICATIONS

"Deadlock Detection and Resolution for Discrete Event Simulation: Multiple-Unit Seizes" by Venkatesh, Smith, Deuemeyer and Curry, p. 201-16, in IIE Trans vol. 30/3, Mar. 1998, Chapman & Hall.*
"Extending Java to Support Shared Resource Protection and Deadlock Detection in Threads Programming" by Van Engen, Bradshaw, and Oostendorp, ACM Crossroads, v4.2, Winter 1997.*
"Dynamic Instrumentation of Threaded Applications" by Xu, Miller and Naim, p. 49-59, in Proceedings of the Seventh ACM SIGPLAN symposium on Principles and Practice of Parallel Programming, May 1999, Atlanta, USA.*

(Continued)

*Primary Examiner* — Henry Tsai
*Assistant Examiner* — Jing-Yih Shyu
(74) *Attorney, Agent, or Firm* — Anthony V S England; Terrence J. Carroll (57) ABSTRACT

In tracking a deadlock caused by at least one application, a computing system is communicatively coupled to a computing device, wherein the computing device has the at least one application. A source code line in the at least one application is identified, wherein the at least one application includes a plurality of source code lines. A deadlock identifier is generated by the computing system and the computing system transmits a first response to the application, wherein first response includes the deadlock identifier. The deadlock identifier is extracted from the first response, the source code line is captured, and a second response is transmitted to the computer system by the application. The second response includes the source code line and the deadlock identifier.

20 Claims, 5 Drawing Sheets

OTHER PUBLICATIONS

"Modelling Multi-Threading in Java" by Wabenhorst and Potter, p. 153-164 in IEEE Proceedings of the Conference: Technology of Object Oriented Languages and Systems (Tools 25), Australia, Nov. 1997.*

"Modelling and Validation of Java Multithreading Applications using SPIN" by Dematini, Iosif, and Sisto, p. 577-603 in Software—Practice and Experience, v29/7, Jul. 1999, Wiley.*

Williams, Amy Lynne, "Static Detection of Deadlock for Java Libraries", Massachusetts Institute of Technology, 67 pp. (2005).*

Tracking down a deadlock in a WebSphere Application Server V6.1 application, http://www.ibm.com/developerworks/websphere/library/techarticles/0805_smith/0805_smith.html, May 28, 2008.

Oracle Enterprise Manager 10g: Oracle Diagnostics Pack for Oracle Middleware Data Sheet, Copyright © 2009, downloaded from http://www.oracle.com/technology/products/oem/pdf/ds_as_dp.pdf Apr. 25, 2010.

* cited by examiner

410: Generic First Response
- DeadLockID
- SQL Response identifier
- ..........
- ..........

336
- DeadLockID
- WAS_INVOLVED_IN_DEADLOCK

337
- DeadLockID
  SQL0911

Figure 4 A

420: Generic Second Response
- DeadLockID.
- Source code line for Computer Application.
- Corresponding Thread Track Trace of Computer Application.
- ..................
- ................

312
- DeadLockID.
- Source code line for Computer Application 2.
- Corresponding Thread Track Trace of Computer Application 2.

322
- DeadLockID.
- Source code line for Computer Application 2.
- Corresponding Thread Track Trace of Computer Application 2.

TRACKING DATABASE DEADLOCK

BACKGROUND OF THE INVENTION

In any system a deadlock occurs when two or more applications are waiting on a resource that the other application holds. In such a situation, neither will be able to proceed and neither will relinquish their locked resources voluntarily. In such cases, typically deadlock detector mechanism are used, where the system is periodically monitoring for deadlocks, and if a deadlock occurs, one of the transactions is terminated thereby causing that transaction to release its locks so that the other application can proceed.

In recent times, multithreaded processing has become a common feature facilitating optimal utilization of processor resources. Operating systems that support multithreaded processing typically include a scheduler for coordinating the processing of multiple threads. A computer system executing a multithreaded computer program often includes shared resources, such as program objects, to which more than one thread seek access, which can lead to deadlocks To address this conflict, many shared resources are capable of being locked by a thread, preventing other threads from accessing the resources while the resources remain in the locked state. Two or more threads may include a certain sequence of locks and unlocks upon shared resources that, if executed in a particular sequence relative to each other, could result in a deadlock.

Techniques exist to decide which transaction may be permitted to continue and which transaction shall be aborted in case such a deadlock occurs. Normally, in resolving such deadlock transaction, those transactions having higher priorities are given precedence over transactions having a lower priority.

Currently, methods exist to obtain the entire transaction data of computer applications that result in deadlocks. The transaction data includes all or a large section of the code executed in each of the transactions until the occurrence of a deadlock. Such transaction data is presently available to application developers to determine specific lines of code responsible for causing the deadlock. While this information is useful, multitude of industry-standard applications have large code bases and these code bases access vast number of tables and code-paths that further access the resources. Given this complex application code base, pinpointing a specific line of source code for each thread/application that caused a deadlock can be difficult and time consuming.

BRIEF SUMMARY OF THE INVENTION

Embodiments of the invention are directed to a method, a system and a computer program of tracking a database deadlock. Tracking includes identifying a source, for example a source code line, leading to the deadlock in a computing system (hereinafter also referred to as a computer system), the source being part of an application (hereinafter also referred to as a computer application), which is communicatively coupled to the computer system, preferably in a distributed manner.

According to one embodiment of the invention, a method of tracking the database deadlock is disclosed. The method includes identifying a source, preferably a source code line, leading to a deadlock in a computer system. For example, the source code line is a part of a plurality of lines of source code of a computer application.

According to an embodiment of the invention the computer system is configured to generate a deadlock identifier and transmit a first response to the computer application. The first response also includes the deadlock identifier.

A further embodiment discloses extracting the deadlock identifier from the first response and capturing the source code line.

According to yet a further embodiment of the invention is disclosed transmitting a second response to the computer system by the computer application is disclosed. The second response comprises the source code line and the deadlock identifier.

According to yet a further embodiment of the invention, is disclosed a storage medium tangibly embodying a program of machine-readable instructions to carry out a method of tracking the database deadlock. The method includes identifying a source, for example source code line, leading to a deadlock in a computer system as described below. The source code line is included among the plurality of lines of source code of a computer application. The computer application is communicatively coupled to the computer system in a distributed manner. The storage medium is configured so as to enable the computer system to generate a deadlock identifier and transmit a first response to the computer application. The first response comprises the deadlock identifier. The storage medium is configured to enable the computer application to extract the deadlock identifier from the first response, capture the source code line and transmit a second response to the computer system. The second response comprises the source, for example source code line and the deadlock identifier. Other embodiments of the invention are also disclosed.

BRIEF DESCRIPTION OF THE DRAWINGS

Embodiments of the invention are described in detail below, by way of example only, with reference to the following drawings, where.

DETAILED DESCRIPTION OF THE INVENTION

Embodiments of the invention relate to tracking a deadlock on a computer system wherein the deadlock is caused by at least one computer application, and the computer system is communicatively coupled to a computing device (hereinafter also referred to as a computer device or device) in a distributed manner further wherein the computer device has the at least one computer it is desirable to note that there could be multiple threads of a single computer application or the multiple threads can be from a plurality of computer applications.

Determining reasons for deadlock occurrence in executing computer applications and overcoming such occurrence can enable transactions related to differing computer applications to be successfully completed. In one embodiment, tracking down the two lines of an application code that caused the deadlock and modifying the application logic in that part of the application which leads to the deadlock prevents repeat deadlock occurrence.

Figure 1:
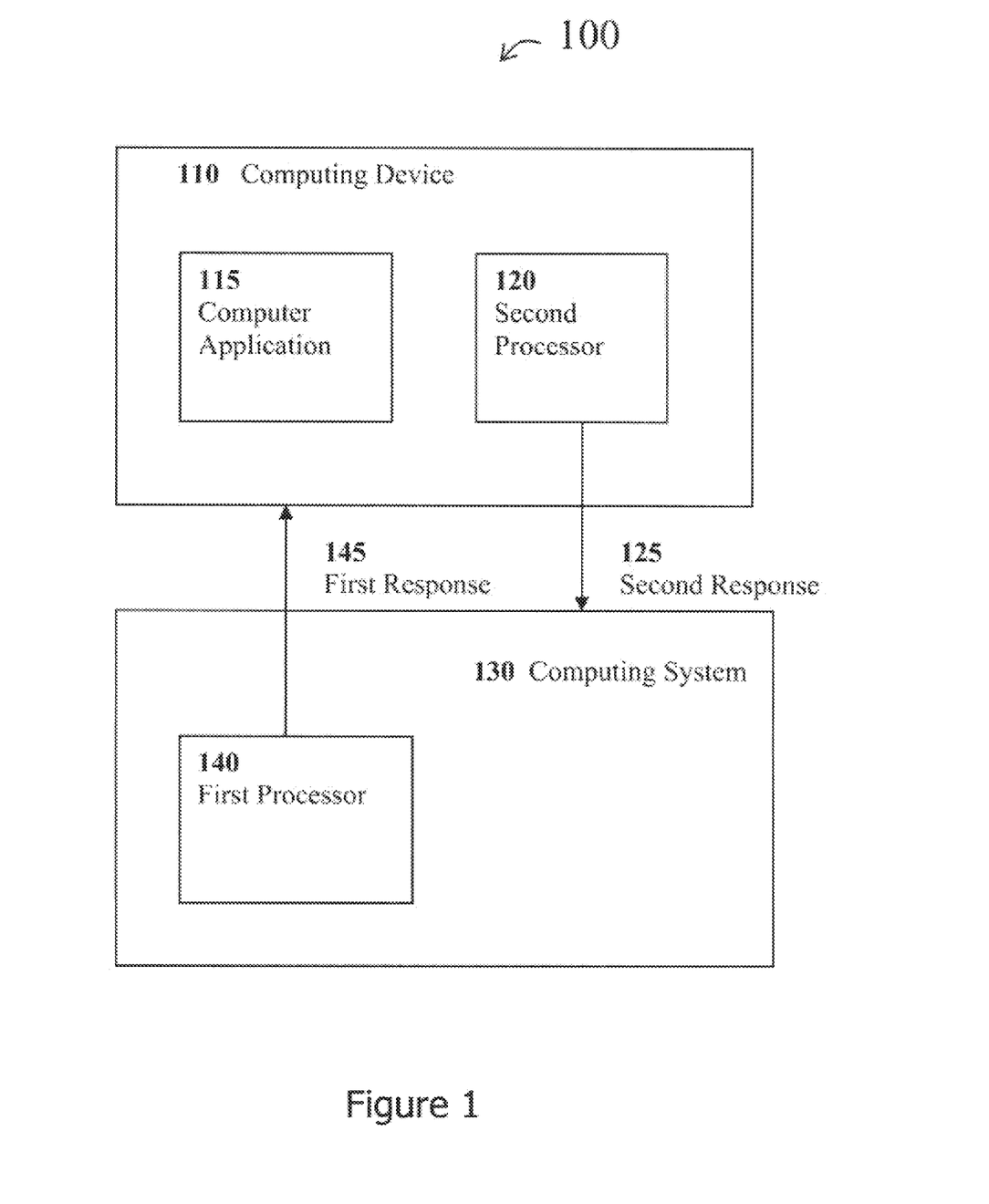
FIG. 1 shows a high-level schematic illustrating interaction between a computer system and a computer application involved in a deadlock according to an embodiment of the invention.

FIG. 1 shows a schematic block 100 illustrating interaction between various elements involved in a deadlock according to an embodiment of the invention. Schematic 100 includes a computing device 110 and a computer system 130. The computing device 110 includes a computer application 115 and a processor 120 (e.g., a second processor). The computer system 130 includes a processor 140 (e.g. first processor). It should be obvious to one skilled in the art that the computing device 110 and the computing system 120 can contain a plurality of processors and the single processor indicated in FIG. 1 is only illustrative in nature. Communication between the first processor 140 and the computing device 110 is indicated by a communication link 145 (e.g. first response) and communication between the second processor 120 and the computer system 130 is indicated by a communication link 125 (e.g., second response)

When a deadlock is encountered by computer system 130, the first processor 140 generates and transmits a deadlock identifier embedded in the first response 145 to the computer application 115 involved in the deadlock. The second processor 120 associated with the computer application 115 that receives the first response 145 from the computer system 130 extracts the deadlock identifier from the first response 145 and captures a corresponding source code line for the deadlock in corresponding thread stack trace. The second processor 120 transmits the second response 125 to the computer system 130. The second response 125 includes the deadlock identifier and thread stack trace with the specific line of source code corresponding to the deadlock.

Figure 2:
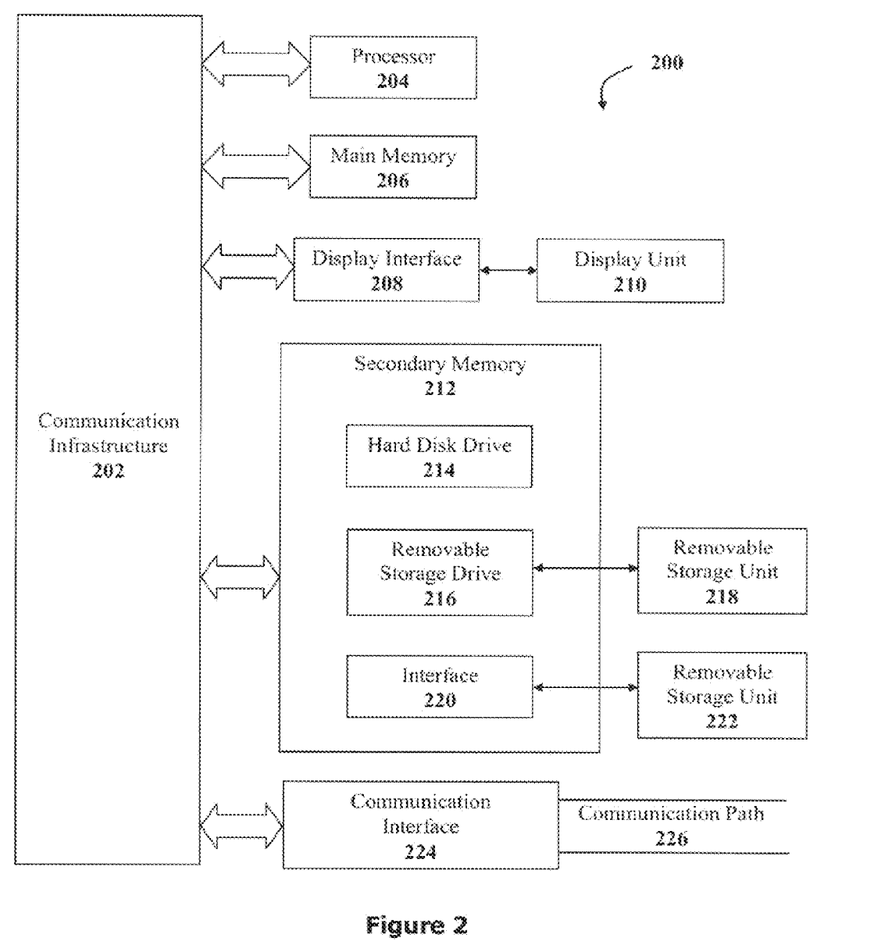
FIG. 2 shows a detailed schematic of a data processing system used for identifying a source code line leading to a deadlock in a computer system according to an embodiment of the invention.

FIG. 2 is a block diagram of an exemplary computer system 200 that can be used for implementing various embodiments of the present invention. In some embodiments, the computer system 200 can be used as the computer system 130 or the computing device 110 shown in FIG. 1. The computer system 200 includes a processor 204. It should be understood that although FIG. 2 illustrates a single processor, one skilled in the art would appreciate that more than one processor can be included as needed. The processor 204 is connected to a communication infrastructure 202 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 200 can include a display interface 208 configured to forward graphics, text, and other data from the communication infrastructure 202 (or from a frame buffer not shown) for display on a display unit 210. The computer system 200 also includes a main memory 206, which can be random access memory (RAM), and may also include a secondary memory 212. The secondary memory 212 may include, for example, a hard disk drive 214 and/or a removable storage drive 216, representing a floppy disk drive, a magnetic tape drive, an optical disk drive, etc. The removable storage drive 216 reads from and/or writes to a removable storage unit 218 in a manner well known to those having ordinary skill in the art. The removable storage unit 218, represents, for example, a floppy disk, magnetic tape, optical disk, etc. which is read by and written to by the removable storage drive 216. As will be appreciated by one skilled in the art, the removable storage unit 218 includes a computer usable storage medium having stored therein computer software and/or data.

In exemplary embodiments, the secondary memory 212 may include other similar means for allowing computer programs or other instructions to be loaded into the computer system. Such means may include, for example, a removable storage unit 222 and an interface 220. Examples of such may include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to the computer system 200.

The computer system 200 may also include a communications interface 224. The communications interface 224 allows software and data to be transferred between the computer system and external devices. Examples of the communications interface 224 may include a modem, a network interface (such as an Ethernet card), a communications port, a PCM-CIA slot and card, etc. Software and data transferred via the communications interface 224 are in the form of signals which may be, for example, electronic, electromagnetic, optical, or other signals capable of being received by communications interface 224. These signals are provided to the communications interface 224 via a communications path (that is, channel) 226. The channel 226 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 206 and the secondary memory 212, the removable storage drive 216, a hard disk installed in the hard disk drive 214, and signals. These computer program products are means for providing software to the computer system. The computer readable medium allows the computer system to read data, instructions, messages or message packets, and other computer readable information from the computer readable medium. The computer readable medium, for example, may include non-volatile memory, such as floppy, ROM, flash memory, disk drive memory, CD-ROM, and other permanent storage. It can be used, for example, to transport information, such as data and computer instructions, between computer systems. Furthermore, the computer readable medium may contain computer readable information in a transitory state medium such as a network link and/or a network interface, including a wired network or a wireless network that allows a computer to read such computer readable information.

Computer programs (also referred to herein as computer control logic) are stored in the main memory 206 and/or the secondary memory 212. Computer programs may also be received via the communications interface 224. Such computer programs, when executed, can enable the computer system to perform the features of exemplary embodiments of the present invention as discussed herein. In particular, the computer programs, when executed, enable the processor 204 to perform the features of the computer system 200. Accordingly, such computer programs represent controllers of the computer system.

Figure 3:
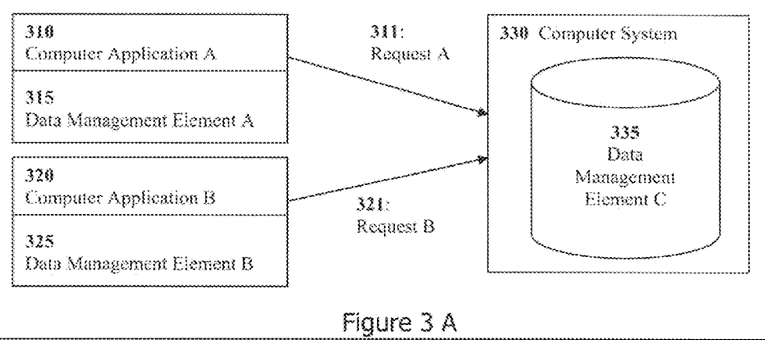
FIG. 3A, FIG. 3B, and FIG. 3C show exemplary schematics of two computer applications involved in a deadlock while interacting with a computer system according to an embodiment of the invention.

FIGS. 3A, 3B and 3C show schematic of exemplary embodiments of two computer applications involved in a deadlock while interacting with an exemplary computer system of FIG. 2, as discussed below. FIGS. 3A, 3B and 3C show different interactions between two applications, preferably computer applications, and a computer system. Each of the FIGS. 3A, 3B and 3C includes a computer application A 310, a corresponding data management element A 315, a computer application B 320, a corresponding data management element B 325, a computer system 330 and a corresponding data management element C 335.

FIG. 3A shows a request A 311 generated at computer application A 310 and transmitted from the computer application A 310 and a request B 321 generated at computer application B 320 and transmitted from the computer application B 320. When both these requests 311 and 321 seek the same resource in the computer system 330, a potential deadlock situation arises.

FIG. 3B shows that upon encountering a deadlock, the computer system 330 creates a deadlock identifier and transmits it as a part of a first response A 336 to the computer application A 310, and a first response B 337 to the computer application B 320.

FIG. 3C shows a response given by computer applications to computer system. Upon receiving a first response from computer system, the processor associated with each computer application extracts the deadlock identifier and identifies corresponding thread stack trace and the specific source code line causing the deadlock. The computer application A 310 sends a second response A 312 to the computer system 330. The computer application B 320 sends a second response B 322 to the computer system 330. Each of the second responses 312 and 322 includes the deadlock identifier, respective thread stack trace and respective source code line responsible for the deadlock.

Figure 4:
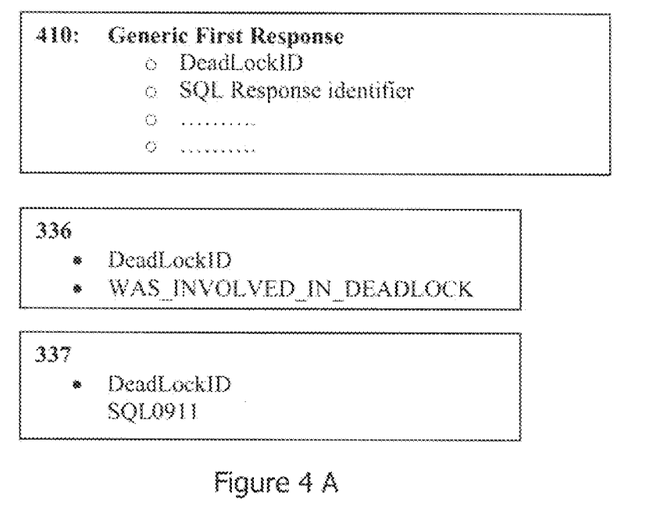
FIG. 4A and FIG. 4B schematically illustrate further details of a first response and a second response described in FIG. 3B and FIG. 3C according to an embodiment of the invention.

FIGS. 4A and 4B schematically illustrate further details of a first response and a second response described in FIGS. 3B and 3C, respectively. FIG. 4A includes generic a first response 410 and illustrates exemplary details of the first responses 336 and 337 depicted in FIG. 3B. The generic first response 410 includes deadlock identifier indicated by DeadLockID, and may include other elements such as a SQL response identifier. In an exemplary embodiment the computer application A 310 of FIG. 3A, that is involved in the deadlock is selected to proceed by the computer system 330 (as shown in the FIG. 3A). The first response 336 (as shown in the FIG. 3B) sent by the computer system 330 to the computer application A 310 (as shown in the FIG. 3B) includes the deadlock identifier indicated by DeadLockID and also includes 'WAS_INVOLVED_IN_DEADLOCK' identifier. In an exemplary embodiment the computer application B 320 (as shown in the FIG. 3B), transaction is being killed/rolled back, the computer system 330 responds to the computer application B 320 with the first response B 337. The first response B 337 includes the deadlock identifier indicated by DeadLockID and the first response B 337 also includes a 'SQL0911' identifier, indicating that the computer application B 320 was rolled back.

FIG. 4B includes a generic second response 420 and shows details of two exemplary embodiments of second response 312 and 322 depicted in FIG. 3C. The generic second response 420 includes deadlock identifier indicated by DeadLockID, and corresponding source code line that caused the deadlock. Generic second response may also include other elements such as thread stack trace. In this exemplary embodiment the computer application A 310 (as shown in the FIG. 3B) involved in the deadlock is selected to proceed by the computer system 330 (as shown in the FIG. 3B). The second response 312 sent by the computer application A 310 (as shown in the FIG. 3B), includes the deadlock identifier indicated by DeadLockID and respective source code line responsible for the deadlock and may include respective thread stack trace. In an exemplary embodiment the transaction of the computer application A 320 (as shown in the FIG. 3B) involved in the deadlock is selected to be killed/rolled back, by the computer system 330 (as shown in the FIG. 3B). The second response 322 sent by the computer application A 320 (as shown in the FIG. 3B), includes the deadlock identifier indicated by DeadLockID and respective source code line responsible for the deadlock and may include respective thread stack trace.

With this, the computer system 330 of FIG. 3A through FIG. 3C, now additionally has the two source code line numbers or source code lines and also corresponding trace information of the thread stack of the two computer applications that were involved in a deadlock. This information is useful to the users including but not limited to application developers who can utilize the information and modify the application logic.

Figure 5:
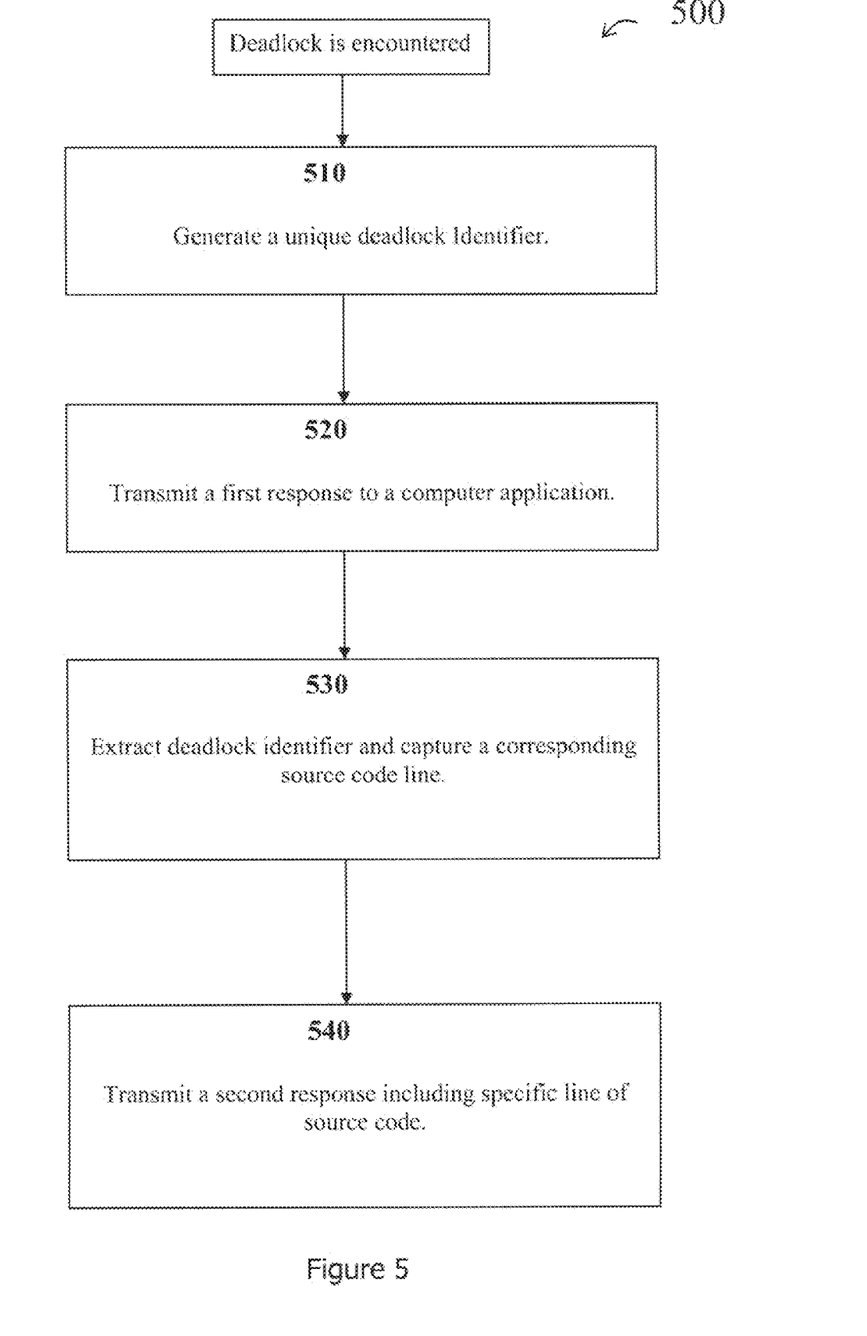
FIG. 5 is a flow chart illustrating a general method for identifying a source code line leading to a deadlock in a computer system.

FIG. 5, shows a flow chart illustrating an exemplary embodiment of a general process 500 for identifying a source code line leading to a deadlock in a computer system, the source code line being included among a plurality of lines of source code of a computer application, the computer application being communicatively coupled to the computer system in a distributed manner. When a deadlock is encountered by a computer system, as depicted in step 510, the computer system generates a deadlock identifier in computer system. As shown in step 520, computer system transmits this generated deadlock identifier in a first response to a computer application involved in the deadlock. Step 530 depicts that the computer application that receives the first response from the computer system, extracts the deadlock identifier from the first response, and captures a corresponding source code line for the deadlock in the thread stack trace. Step 540 depicts the computer application transmits a second response to the computer system. The second response includes the deadlock identifier and thread stack trace with the specific line of source code corresponding to the deadlock.

The described techniques may be implemented as a method, an apparatus or an article of manufacture involving software, firmware, micro-code, hardware such as logic, memory and/or any combination thereof. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices.

Certain embodiments can take the form of an entirely hardware embodiment, an entirely software embodiment or an embodiment containing both hardware and software elements. In some embodiments, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments. Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

When a single element or article is described herein, it will be apparent that more than one element/article (whether or not they cooperate) may be used in place of a single element/article. Similarly, where more than one element or article is described herein (whether or not they cooperate), it will be apparent that a single element/article may be used in place of the more than one element or article. The functionality and/or the features of an element may be alternatively embodied by one or more other elements which are not explicitly described as having such functionality/features. Thus, other embodiments need not include the element itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising". "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

What is claimed is:

1. A method for tracking a deadlock in a computing system, the deadlock caused by at least one application, the computing system communicatively coupled to a computing device, the computing device including the at least one application, the method comprising:
    sending a request to the computing system from the at least one application for a resource of the computing system, wherein the request includes a request for locking the resource, unlocking the resource or data manipulation;
    receiving, by the computing device, a first response from the computing system to the at least one application, wherein the first response notifies the computing device of a deadlock detected by the computing system, wherein the request was detected by the computing system as a cause of the deadlock, and wherein the first response includes a deadlock identifier generated by the computing system for the detected deadlock;
    extracting the deadlock identifier from the first response by the computing device; capturing, by the computing device responsive to the first response, a stack trace for the request to the computing system from the at least one application and corresponding to the deadlock;
    identifying, by the computing device responsive to the first response, a source code line in the at least one application for the request to the computing system, wherein the source code line is in the stack trace corresponding to the deadlock and is for the request to the computing system and was a cause of the deadlock, and wherein the at least one application includes a plurality of source code lines; and
    transmitting a second response to the computing system by the computing device, including transmitting in the second response the deadlock identifier, the thread stack trace, and the source code line or a line number of the source code line.

2. The method of claim 1, wherein the at least one application is configured to extract the deadlock identifier from the first response.

3. The method of claim 1, wherein each of the computing system and the at least one application comprises a data management element.

4. The method of claim 3, wherein the data management element comprises a relational database configured to support static SQL and a relational database configured to support a dynamic SQL.

5. The method of claim 1, wherein method includes:
    rolling back a transaction for the request sent by the at least one application in response to the computing device receiving a roll back notification from the computer system for resolving the deadlock.

6. The method of claim 1, wherein the method includes:
    proceeding with a transaction for the request sent by the at least one application in response to the computing device receiving a proceed notification from the computer system for resolving the deadlock.

7. The method of claim 1, wherein the source code line or source code line number is selected from a set comprising a source code line or source code line number for a method, a routine, a sub-routine, a procedure and a function.

8. A system for tracking a deadlock in a computing system, the deadlock caused by at least one application, the computing system communicatively coupled to a computing device, the computing device including the at least one application, the system comprising a processor configured to:

send a request to the computing system from the at least one application for a resource of the computing system, wherein the request includes a request of locking the resource, unlocking the resource or data manipulation; and receive a first response from the computing system, wherein the first response notifies the computing device of a deadlock detected by the computing system, wherein the request was detected by the computing system as a cause of the deadlock, and wherein the first response includes a deadlock identifier generated by the computing system for the detected deadlock;

extract the deadlock identifier from the first response;

capture, responsive to the first response, a stack trace for the request to the computing system from the at least one application and corresponding to the deadlock;

identify, responsive to the first response, a source code line in the at least one application for the request to the computing system, wherein the source code line is in the stack trace corresponding to the deadlock and is for the request to the computing system and was a cause of the deadlock, and wherein the at least one application includes a plurality of source code lines; and transmitting a second response to the computing system, including transmitting in the second response the deadlock identifier, the thread stack trace, and the source code line or a line number of the source code line.

9. A non-transitory storage medium tangibly embodying a program of machine-readable instructions executable by a digital processing apparatus to carry out a method for tracking a deadlock in a computing system, the deadlock caused by at least one application, the computing system communicatively coupled to a computing device, the computing device including the at least one application, the storage medium configured to:

send a request to the computing system from the at least one application for a resource of the computing system, wherein the request includes a request of locking the resource, unlocking the resource or data manipulation; and receive, by the computing device, a first response from the computing system, wherein the first response notifies the computing device of a deadlock detected by the computing system, wherein the request was detected by the computing system as a cause of the deadlock, and wherein the first response includes a deadlock identifier generated by the computing system for the detected deadlock;

extract the deadlock identifier from the first response by the computing device;

capture, by the computing device responsive to the first response, a stack trace for the request to the computing system from the at least one application and corresponding to the deadlock;

identify, by the computing device responsive to the first response, a source code line in the at least one application for the request to the computing system, wherein the source code line is in the stack trace corresponding to the deadlock and is for the request to the computing system and was a cause of the deadlock, and wherein the at least one application includes a plurality of source code lines; and transmit a second response to the computing system by the computing device, including transmitting in the second response the deadlock identifier, the thread stack trace, and the source code line or a line number of the source code line.

10. The system of claim 8, wherein the at least one application is configured to extract the deadlock identifier from the first response.

11. The system of claim 8, wherein each of the computing system and the at least one application comprises a data management element.

12. The system of claim 11, wherein the data management element comprises a relational database configured to support static SQL and a relational database configured to support a dynamic SQL.

13. The system of claim 8, wherein the processor is configured to roll back a transaction for the request sent by the at least one application in response to receiving a roll back notification from the computer system for resolving the deadlock.

14. The system of claim 8, wherein the processor is configured to proceed with a transaction for the request sent by the at least one application in response to receiving a proceed notification from the computer system for resolving the deadlock.

15. The system of claim 8, wherein the source code line or source code line number is selected from a set comprising a source code line or source code line number for a method, a routine, a sub-routine, a procedure and a function.

16. The non-transitory storage medium of claim 9, wherein each of the computing system and the at least one application comprises a data management element.

17. The non-transitory storage medium of claim 16, wherein the data management element comprises a relational database configured to support static SQL and a relational database configured to support a dynamic SQL.

18. The non-transitory storage medium of claim 9, wherein the processor is configured to roll back a transaction for the request sent by the at least one application in response to receiving a roll back notification from the computer system for resolving the deadlock.

19. The non-transitory storage medium of claim 9, wherein the processor is configured to proceed with a transaction for the request sent by the at least one application in response to receiving a proceed notification from the computer system for resolving the deadlock.

20. The non-transitory storage medium of claim 9, wherein the source code line or source code line number is selected from a set comprising a source code line or source code line number for a method, a routine, a sub-routine, a procedure and a function.

* * * * *